(12) United States Patent
Bouthemy et al.

(10) Patent No.: US 8,747,099 B2
(45) Date of Patent: Jun. 10, 2014

(54) TOOLING FOR INJECTION-MOLDING A PART

(75) Inventors: Philippe Bouthemy, Issy les Moulineaux (FR); Serge Dillenseger, Jouy le Moutier (FR); Patrick Pourfilet, Asnieres sur Seine (FR); Daniel Quach, Fontenay sous Bois (FR); Jean-Louis Martial Verger, Bondy (FR)

(73) Assignee: SNECMA, Paris (FR)

( * ) Notice: Subject to any disclaimer, the term of this patent is extended or adjusted under 35 U.S.C. 154(b) by 43 days.

(21) Appl. No.: 13/642,995

(22) PCT Filed: May 10, 2011

(86) PCT No.: PCT/FR2011/051047
§ 371 (c)(1),
(2), (4) Date: Oct. 23, 2012

(87) PCT Pub. No.: WO2011/141674
PCT Pub. Date: Nov. 17, 2011

(65) Prior Publication Data
US 2013/0040015 A1 Feb. 14, 2013

(30) Foreign Application Priority Data
May 11, 2010 (FR) ...................................... 10 53665

(51) Int. Cl.
*B29C 45/44* (2006.01)
(52) U.S. Cl.
USPC ..... 425/556; 425/441; 425/577; 425/DIG. 58
(58) Field of Classification Search
USPC ...... 425/556, 577, 436 R, 436 RM, 441, 442, 425/443; 264/334
See application file for complete search history.

(56) References Cited

U.S. PATENT DOCUMENTS

| | | | | | |
|---|---|---|---|---|---|
| 3,545,718 | A | * | 12/1970 | Shale | 249/185 |
| 3,632,277 | A | * | 1/1972 | Stalter | 425/438 |
| 3,930,777 | A | * | 1/1976 | Ramsey | 425/190 |
| 5,773,048 | A | * | 6/1998 | Ramsey | 425/556 |
| 6,082,992 | A | * | 7/2000 | Mitteregger et al. | 425/556 |

(Continued)

FOREIGN PATENT DOCUMENTS

| | | |
|---|---|---|
| EP | 0 013 511 | 7/1980 |
| EP | 1 980 343 | 10/2008 |
| FR | 2 331 939 | 6/1977 |

OTHER PUBLICATIONS

International Search Report issued Aug. 5, 2011 in PCT/FR11/051047 Filed May 10, 2011.

*Primary Examiner* — Yogendra Gupta
*Assistant Examiner* — Emmanuel S Luk
(74) *Attorney, Agent, or Firm* — Oblon, Spivak, McClelland, Maier & Neustadt, L.L.P.

(57) ABSTRACT

A tooling for injection-molding a part, the tooling including two cavity blocks each including a cavity formed therein of a shape corresponding to a shape of a part that is to be molded once the cavity blocks have been superposed, at least one of the cavity blocks including an ejection mechanism ejecting the molded part and including at least one ejector movable between a molding position and an ejection position. The ejector is guided to move between its two positions along a curved path, or a circular arc, of shape that corresponds to a shape of a portion of the mold part to be extracted from the cavity.

8 Claims, 4 Drawing Sheets

(56) References Cited

U.S. PATENT DOCUMENTS

| | | |
|---|---|---|
| 6,399,006 B1 * | 6/2002 | Stoick et al. ............... 264/328.1 |
| 7,264,761 B2 * | 9/2007 | Evans et al. ................ 264/328.1 |
| 8,052,417 B2 * | 11/2011 | Nishimura et al. ........... 425/577 |
| 8,349,240 B2 * | 1/2013 | Smith ........................... 264/318 |
| 8,562,893 B2 * | 10/2013 | Natsume et al. .............. 264/318 |
| 2003/0015308 A1 | 1/2003 | Fosaaen et al. |
| 2006/0079714 A1 * | 4/2006 | Nageswara Rao et al. ..... 564/86 |
| 2008/0251979 A1 | 10/2008 | Louesdon et al. |

* cited by examiner

TOOLING FOR INJECTION-MOLDING A PART

The present invention relates to tooling for injection-molding a part, in particular a wax model.

Such a model is used in a lost wax molding method, in particular for molding high pressure turbine blades for a turbine engine such as a turboprop or a turbojet.

In this method, one or more blades are injection-molded by using injection-molding tooling that has a cavity of shape corresponding to the shape of the model that is to be obtained. When the model has cooling channels, it is possible to use a core. In this event, the wax is injected into the cavity, around the core. Below, it is assumed that no core is used and that the model is solid.

The wax models as obtained in this way are then mounted as a cluster on a support.

The cluster is then dipped in a bath of ceramic, referred to as a slip, and then dusted with a ceramic powder (stuccoworking). Dipping and stuccoworking are repeated several times until a layer of ceramic is obtained that is sufficiently thick and that forms a shell around the cluster.

The wax is then removed from the ceramic shell by passing the assembly in an autoclave where steam under pressure and at high temperature causes the wax to melt (dewaxing).

The shell is then baked in an oven in order to acquire sufficient mechanical strength for it to be used as a mold.

Metal, e.g. a nickel-based alloy, is then cast into the shell. After cooling, the shell is knocked out and then the various parts are removed from the cluster, i.e. they are separated from their common support.

The parts are then trimmed, ground, and then inspected.

As a general rule, tooling for injection-molding the wax model comprises two cavity blocks having a cavity formed therein of shape that matches the shape of the part that is to be molded once the cavity blocks are superposed. One of the cavity blocks has ejection means for ejecting the molded part and comprising at least one ejector movable between a molding position in which it lies outside the corresponding cavity and an ejection position in which it projects into the cavity. In the prior art, the ejectors are movable along a rectilinear path.

The part for molding, e.g. a blade, includes a portion, e.g. a platform, having a radially outer surface that is not plane, but curved. The same applies to the corresponding wax model.

During ejection of the model from the recess, the rectilinear paths of the ejectors do not follow the curvature of the platform of the model and can cause this platform of the model to be deformed, running the risk of a portion of the platform being scratched or torn away.

A particular object of the invention is to provide a solution to this problem that is simple, effective, and inexpensive.

To this end, the invention provides tooling for injection-molding a part, the tooling comprising two cavity blocks each having a cavity formed therein of a shape corresponding to the shape of the part that is to be molded once the cavity blocks have been superposed, at least one of the cavity blocks being fitted with ejection means for ejecting the molded part and comprising at least one ejector movable between a molding position in which it lies outside the corresponding cavity and an ejection position in which it projects into the cavity, the tooling being characterized in that the ejector is guided to move between its two positions along a curved path, e.g. a circular arc, of shape that corresponds to the shape of a portion of the molded part to be extracted from the cavity.

Thus, this portion of a part is not damaged while it is being unmolded. When the part corresponds to the curvature of the platform of a wax model of a blade, the platform is not deformed or damaged during unmolding, thus enabling the blade to be subsequently fabricated accurately and thereby reducing the amount of manual reworking required on metal parts.

Advantageously, the ejector is curved in shape.

According to another characteristic of the invention, the two cavity blocks are mounted to pivot relative to each other about a pin between a molding position in which the two cavity blocks are superposed, and an unmolding position in which the two cavity blocks are spaced apart, and the ejection means include an ejector support having one end mounted to pivot about the pivot pin of the cavity block and having its other end fitted with the ejector.

Preferably, the ejector is actuated with the help of a cam and/or a handle.

Turning the handle or the cam causes the ejector to be moved.

In one possibility of the invention, the cam bears against a support face of an ejector at a point that is spaced apart from the pivot axis, so as to lift the support and the ejector when the cam is turned.

In preferred manner, the ejection means include two ejectors that are parallel or concentric and spaced apart from each other.

Advantageously, the injection-molding tooling includes a stationary bottom cavity block and a movable top cavity block, the ejector being arranged in the bottom cavity block.

Furthermore, at least one of the cavity blocks may be mounted to pivot about the pin via at least one rolling bearing, e.g. a ball bearing.

The invention can be better understood and other details, characteristics, and advantages of the invention appear on reading the following description made by way of non-limiting example and with reference to the accompanying drawings, in which.

FIGS. 1 to 5 show injection-molding tooling of the invention comprising a top portion 1 and a bottom portion 2, which portions are mounted to pivot relative to each other about a pin 3.

Figure 4:
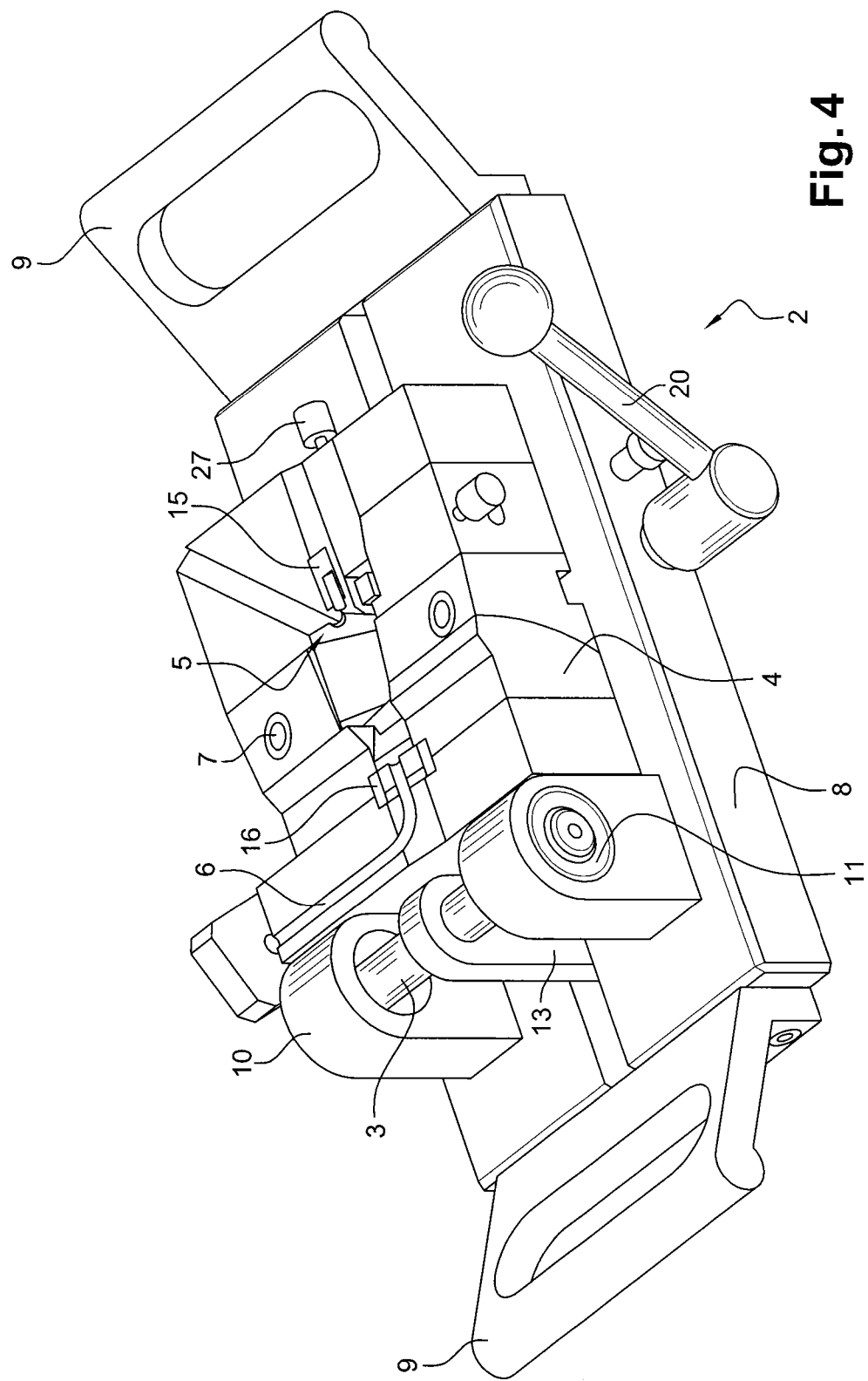
FIGS. 4 and 5 are perspective views showing a bottom portion of the mold, respectively in the molding position and in the position for ejecting the ejection means.
Figure 5:
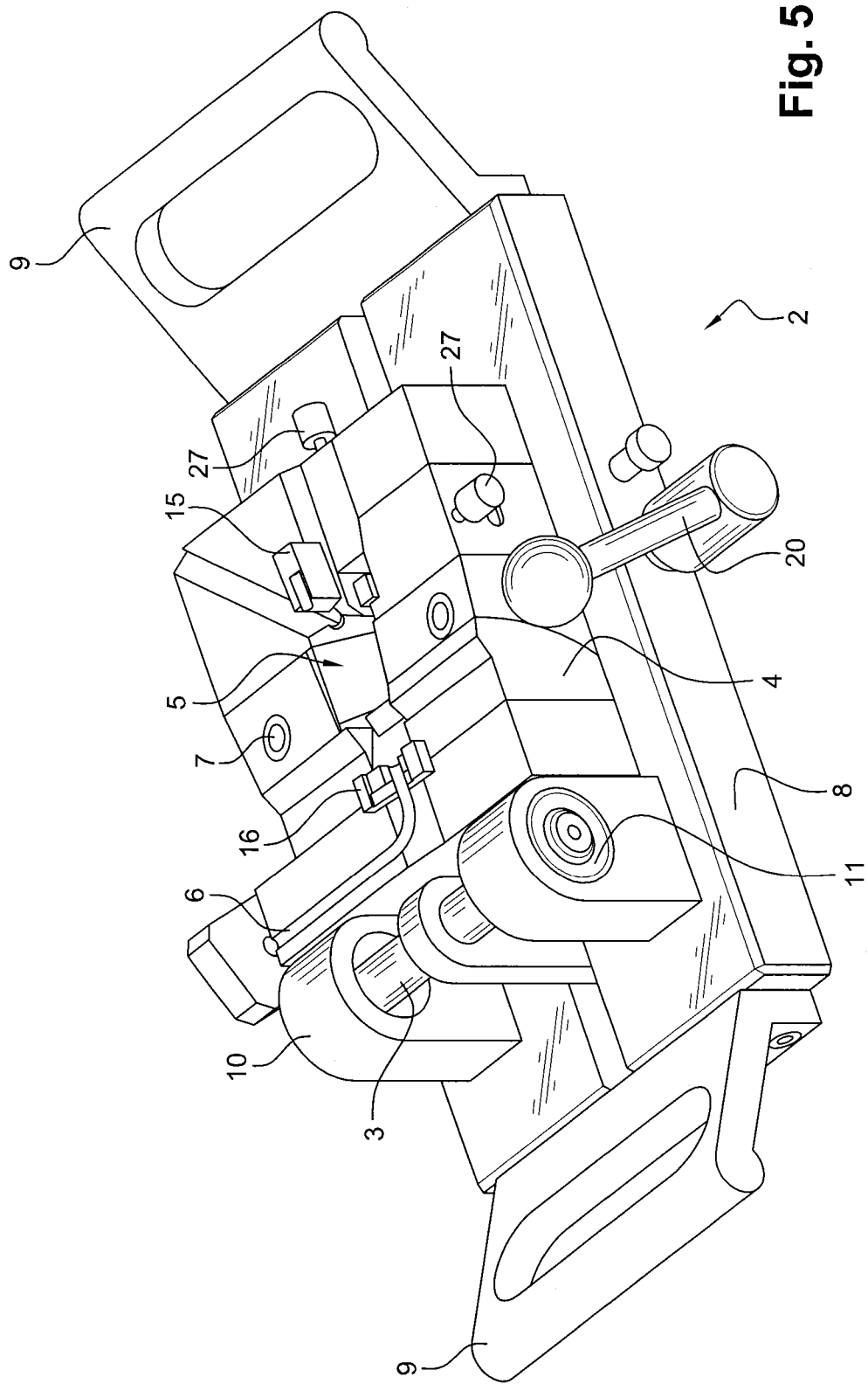

More particularly, the bottom portion 2 comprises a cavity block 4 of generally rectangular shape, having a cavity 5 and an injection channel 6 formed therein, as can be seen more clearly in FIGS. 4 and 5, and mounted by means of a screw 7 on an elongate and plane bottom plate 8, likewise of rectangular shape. The two opposite ends of the plate 8 are fitted with handles 9. The plate 8 also has two lateral lugs 10 arranged on either side of a longitudinal midplane and forming a clevis in which the pin 3 is mounted. More particularly, the pin 3 is guided by two ball bearings 11 mounted in the lugs 10, and is perpendicular to the above-mentioned midplane.

The bottom portion 2 has means for ejecting the molded part, said means comprising a generally L-shaped support 12 having a first portion 13 with its end mounted on the pivot pin 3 and a second portion 14 that is substantially perpendicular to the first portion 13 and from which there extend first and second ejectors 15 and 16 of curved shape. The first ejector 15 extends from the free end of the second portion 14, while the second ejector 16 extends between the first ejector 15 and the first portion 13. More particularly, the ejectors 15 and 16 are of circularly arcuate shape centered on the pivot pin 3. The ejection means extend in the above-mentioned midplane.

Figure 1:
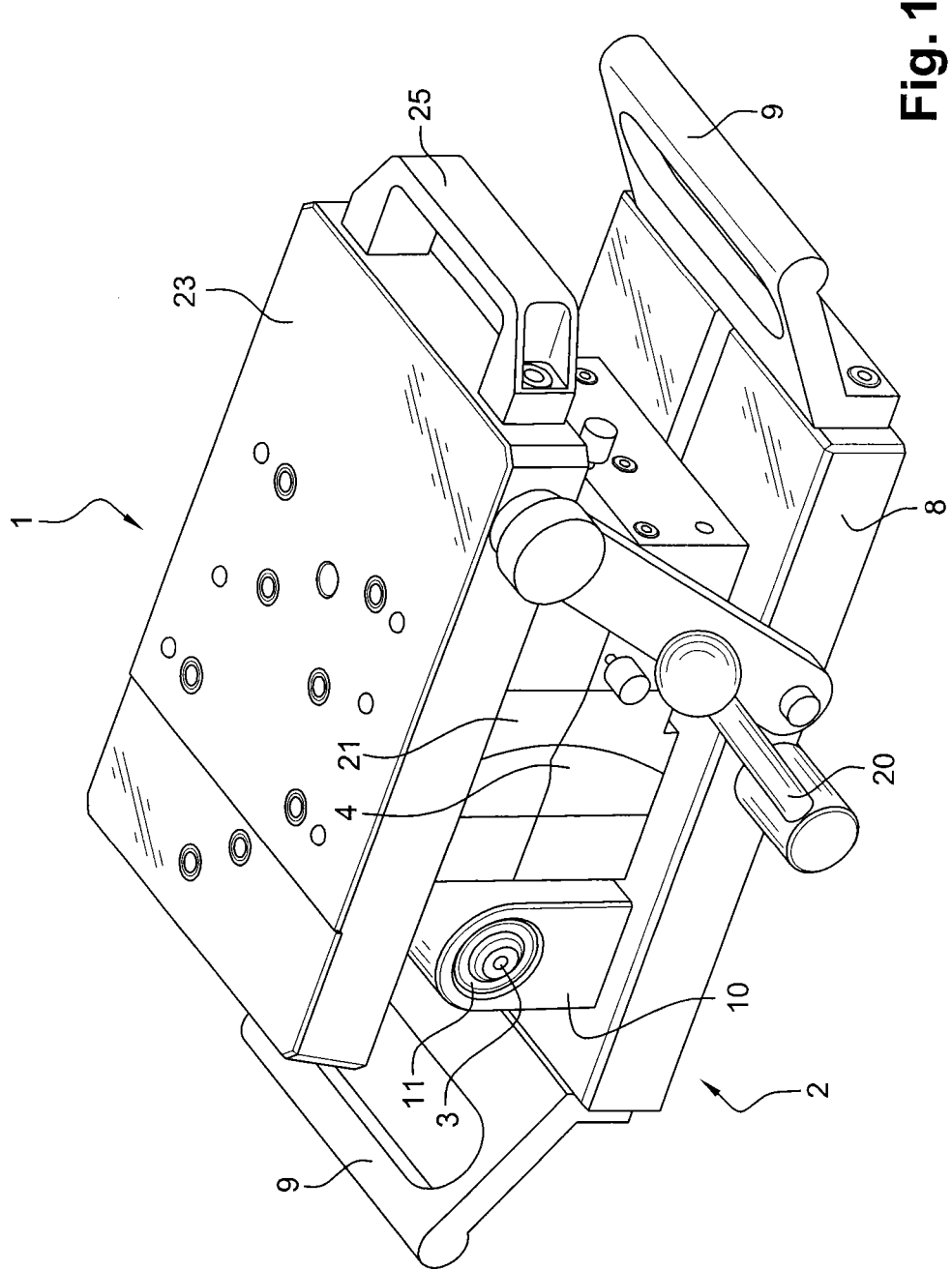
FIG. 1 is a perspective view of tooling of the invention for injection-molding a part, shown in the closed position.
Figure 2:
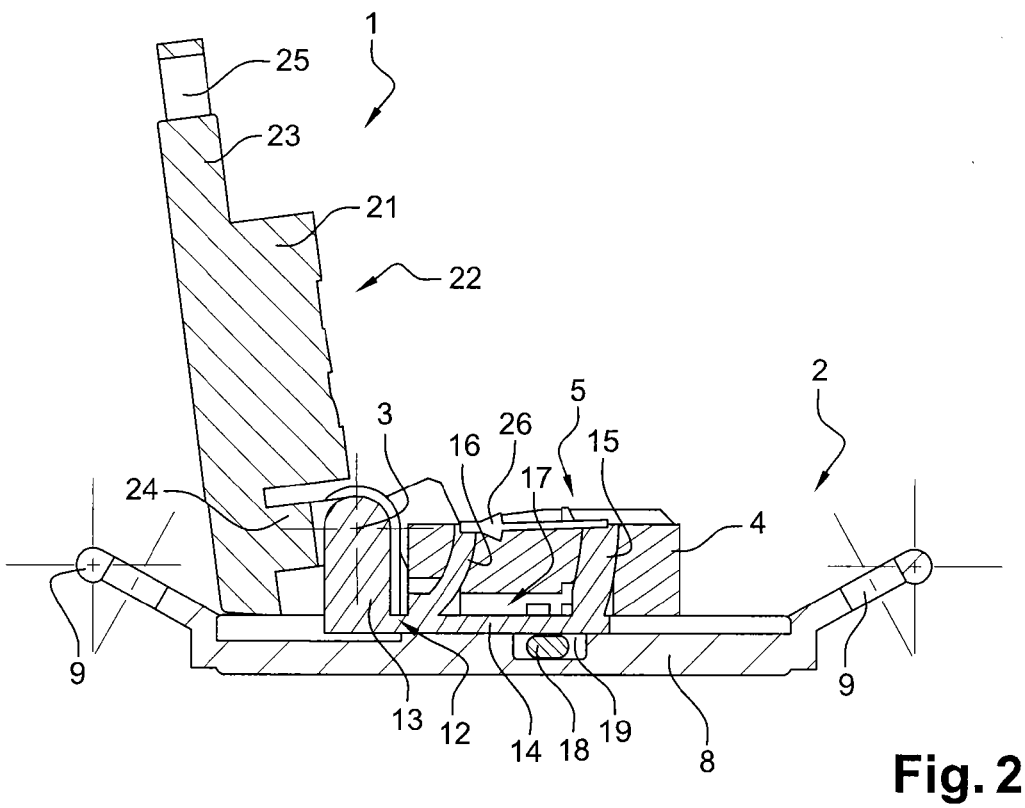
FIG. 2 is a longitudinal section view of the injection-molding tooling shown in the open position, the ejection means being shown in the molding position.

The bottom cavity block 4 has two curved openings of shapes complementary to the shapes of the ejectors and having the ejectors passing therethrough, which openings lead to a bottom empty zone 17 (FIG. 2). The empty zone together with the curved openings allows the ejection means to pivot through a determined angular range, as is described in greater detail below.

A cam 18 is housed in an opening 19 in the plate 8, under the support 12 for the ejection means, the cam 18 being connected to a rod extending through the plate 8 and having its end fitted with a handle 20. Turning the handle 20 thus causes the cam 18 to turn so that it can be moved between a molding position in which it is completely received inside the plate 8, and an ejection position in which it projects from the plate 8 and pushes against the bottom face of the support 14 so as to cause it to pivot about the pin 3.

Figure 3:
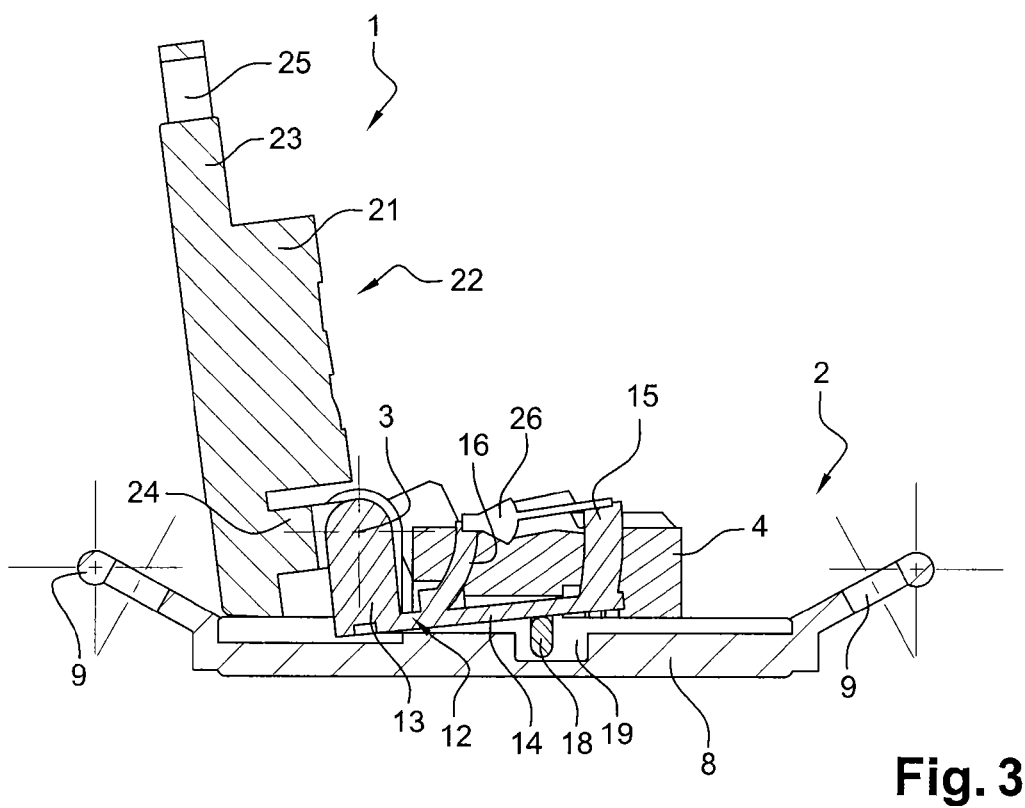
FIG. 3 is a view corresponding to FIG. 2, with the ejection means being shown in the ejection position.

The ejection means are then moved between a molding position in which the ejectors 15 and 16 are outside the cavity 5 and are housed entirely in the cavity block (FIGS. 2 and 4), and an ejection position in which the ejectors project upwards inside the cavity (FIGS. 3 and 5).

The top portion 1 of the injection-molding tooling includes, in the same manner, a cavity block 21 in which there is formed a cavity 22, which block is fastened to a top plate 23. The top plate 23 has two lugs 24 arranged on either side of the longitudinal midplane of the plate 23, forming a clevis that is mounted on the pin 3. More particularly, each lug 24 of the top plate 23 is mounted between the first portion 13 of the support 12 of the ejection means and one of the lugs 10 of the bottom plate 8.

The end of the top plate 23 that is remote from the pivot pin 3 is fitted with a handle 25.

There follows a description in greater detail of the method of molding a blade model 26 out of wax.

When the model 26 includes a hollow portion, such as a cooling circuit, a ceramic core (not shown) is mounted in the cavity 5 of the bottom cavity block 4, it being possible for the core to be positioned with the help of abutments and for it to be held with the help of a presser screw 27, in known manner.

The injection-molding tooling is then closed, i.e.

the top and bottom portions 1 and 2 are pivoted so as to superpose the two cavity blocks 21 and 4, and thus also the two cavities 22 and 5. The shape defined by the cavities 5 and 22, when situated facing each other, corresponds to the shape to be given to the part 26 that is to be molded. In particular, the cavities 5 and 22 define the shape of a blade comprising an airfoil and a platform. At least concerning the zone formed by the cavity 5 in the bottom cavity block 4, the platform presents a shape that is curved and of section that is substantially in the form of a circular arc centered on the pivot pin 3.

A press (not shown) then presses against each of the outside faces of the plates 8 and 23, and wax is injected into the cavities 5 and 22 via the injection channel 6, and then cooled so as to solidify and form a wax blade model 26 (FIGS. 2 and 3).

The injection-molding tooling is then opened, by pivoting the top portion about the pin (FIG. 2).

In order to eject the wax model 26 out from the cavity 5 of the bottom cavity block 4, the handle 20 is actuated so as to cause the cam 18 to pivot, thereby causing the ejection means to pivot. The ejectors 15 and 16 then move along respective curvilinear paths of shape that corresponds to the shape of the platform, and more precisely to the shape of the zone to be extracted from the cavity 5.

This serves to avoid any damage or deformation of the platform. This guarantees that the blade obtained by lost-wax casting, using the method described above, complies with specifications.

The injection-molding tooling is described herein for molding a wax model 26, however it could be used for molding other types of part, in order to solve the same technical problem, i.e. to avoid damaging parts when they are ejected.

The invention claimed is:

1. A tooling for injection-molding a part, the tooling comprising:
    two cavity blocks each including a cavity formed therein of a shape corresponding to a shape of a part that is to be molded once the cavity blocks have been superposed, at least one of the cavity blocks including ejection means for ejecting the molded part and comprising at least one ejector movable between a molding position in which the ejector lies outside the corresponding cavity and an ejection position in which the ejector projects into the cavity,
    wherein the ejector is guided to move between the molding position and the ejection position along a curved path, or a circular arc, of shape that corresponds to a shape of a portion of the molded part to be extracted from the cavity.

2. A tooling according to claim 1, wherein the ejector is curved in shape.

3. A tooling according to claim 1, wherein the two cavity blocks are mounted to pivot relative to each other about a pin between a molding position in which the two cavity blocks are superposed, and an unmolding position in which the two cavity blocks are spaced apart, and wherein the ejection means includes an ejector support having one end mounted to pivot about the pivot pin of the cavity block and having its other end fitted with the ejector.

4. A tooling according to claim 3, wherein the ejector is actuated with help of a cam and/or a handle.

5. A tooling according to claim 4, wherein the cam bears against a support face of the ejector at a point that is spaced apart from the pivot axis, so as to lift the support and the ejector when the cam is turned.

6. A tooling according to claim 1, wherein the ejection means includes two ejectors that are parallel or concentric and spaced apart from each other.

7. A tooling according to claim 1, including a stationary bottom cavity block and a movable top cavity block, the ejector being arranged in the bottom cavity block.

8. A tooling according to claim 3, wherein at least one of the cavity blocks is mounted to pivot about the pin via at least one rolling bearing, or a ball bearing.

* * * * *